Aug. 18, 1931.　　C. W. RESCH　　1,819,972
SWITCHING CONVEYER
Filed May 2, 1929　　3 Sheets-Sheet 1

Inventor
CARL W. RESCH

By C. R. Parker Jr.
Attorney

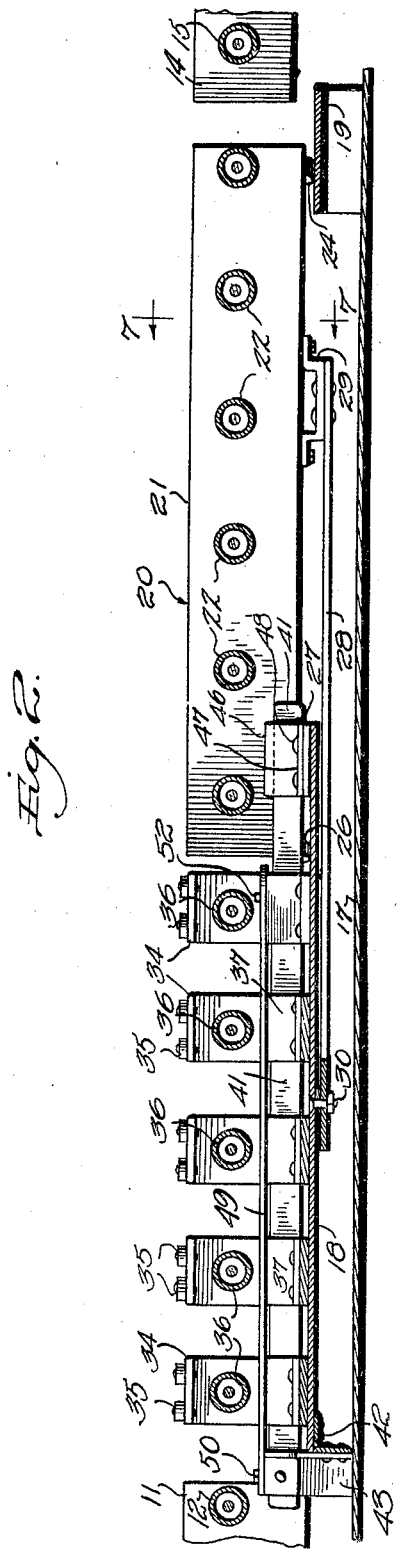
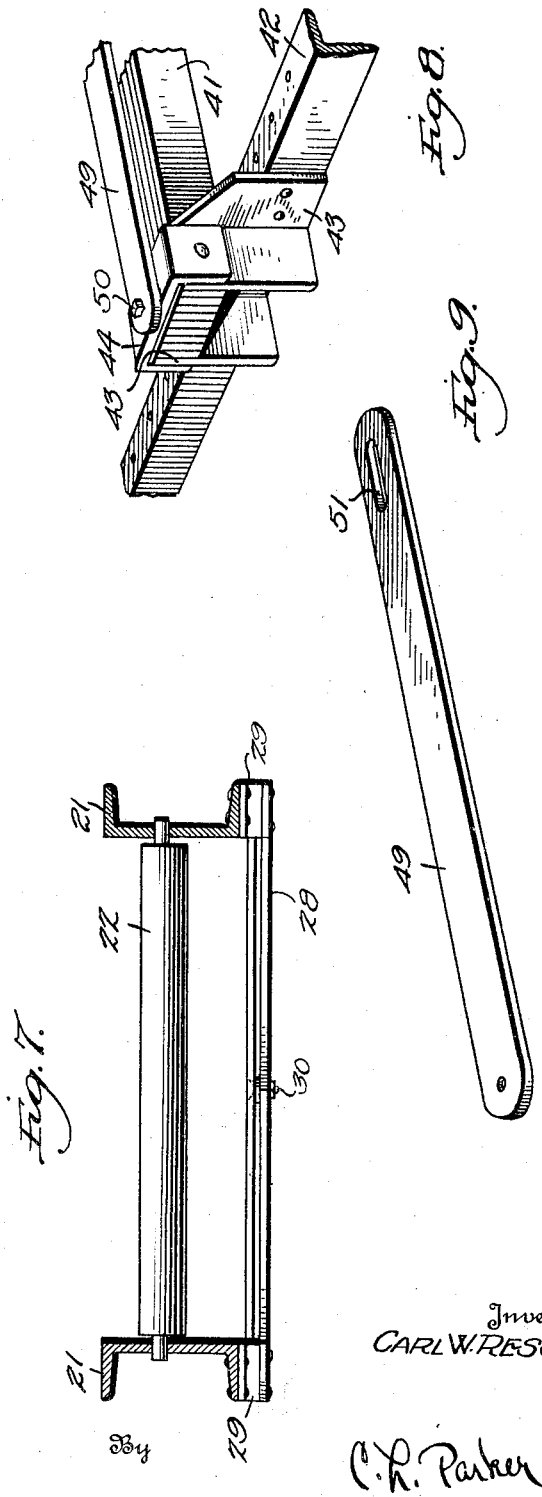

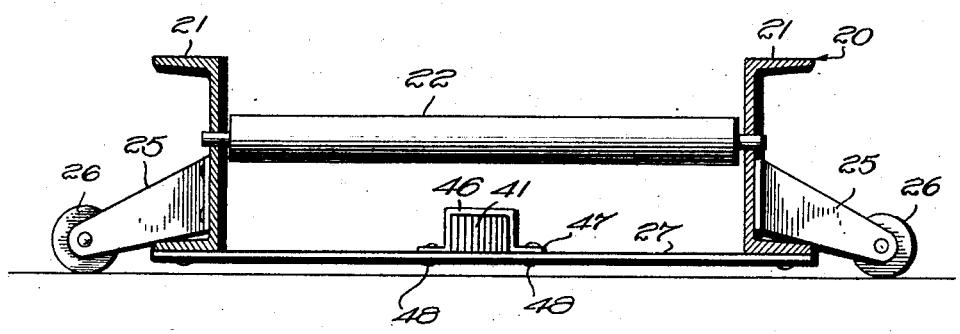
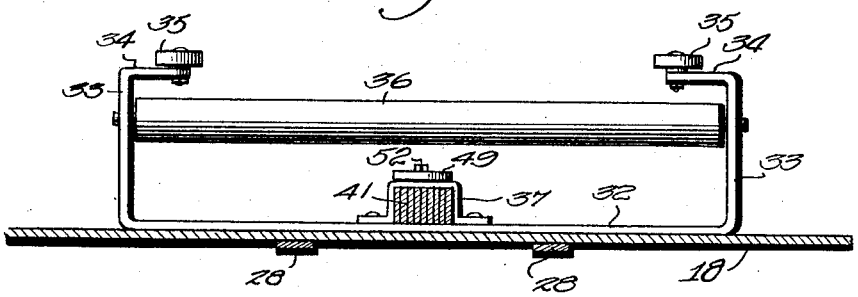
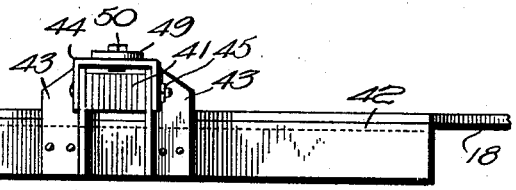
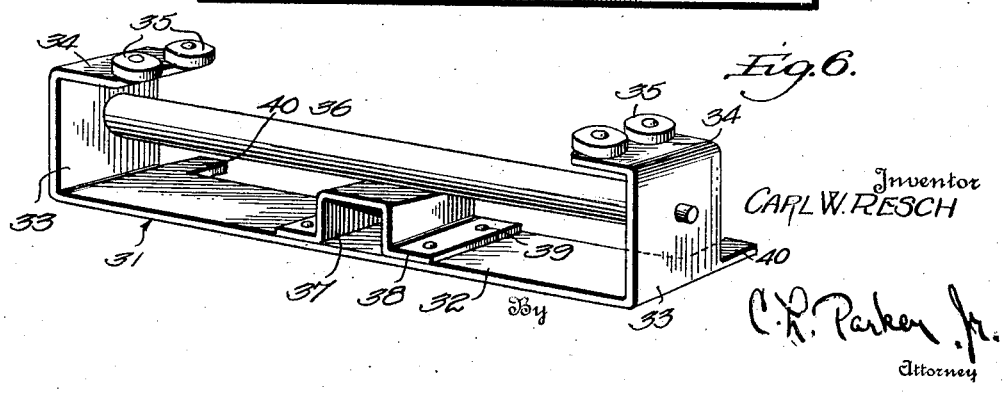

Patented Aug. 18, 1931

1,819,972

UNITED STATES PATENT OFFICE

CARL W. RESCH, OF JEFFERSONVILLE, INDIANA, ASSIGNOR TO LOGAN CO., INC., OF LOUISVILLE, KENTUCKY, A CORPORATION OF KENTUCKY

SWITCHING CONVEYER

Application filed May 2, 1929. Serial No. 359,897.

This invention relates to conveyers, and is an improvement over the conveyer disclosed in the patent to Allen E. Crady, Patent No. 1,741,616, granted December 31, 1929.

In the handling of packages and the like by means of conveyers, it frequently is desirable to provide a movable conveyer section by means of which articles may be transferred between a main fixed conveyer and a plurality of branch conveyers. In order to accomplish this result, it is necessary to provide a conveyer section having one end connected to the fixed conveyer and its opposite end adapted to swing into alinement with either of a plurality of branch conveyers, and in devices of this character, considerable trouble has been experienced in providing an efficient connection between the main conveyer and the movable section to permit articles to pass from one to the other.

In the patent of Allen E. Crady, above referred to, an efficient conveyer of the character referred to has been disclosed, the device including a plurality of conveyer rolls which are adapted to assume substantially radial positions with respect to a given center to facilitate the movement of articles from the fixed conveyer to the branch sections. The present invention is an improvement over the structure disclosed in the patent referred to in that the structure is simple and efficient in operation and may be economically manufactured.

An important object of the present invention is to provide a conveyer of the character referred to having novel means for causing certain of the elements of the connecting conveyer to assume substantially radial positions to facilitate the movement of articles from the fixed conveyer to the branch sections thereof.

A further object is to provide resilient means connected to each of the movable elements referred to above for causing the latter to assume the proper radial positions according to the branch conveyer with which the movable section is to be connected.

A further object is to provide means cooperating with the resilient means for insuring that the movable elements of the swinging conveyer section shall be properly arranged under any given condition.

Other objects and advantages of the invention will become apparent during the course of the following description.

In the drawings I have shown one embodiment of the invention. In this showing,

Figure 2 is a section taken substantially on line 2—2 of Figure 1,

Figure 3 is a transverse section taken substantially on line 3—3 of Figure 1,

Figure 4 is a similar view on line 4—4 of Figure 1,

Figure 5 is a detail section on line 5—5 of Figure 1,

Figure 6 is a detail perspective view of one of the floating conveyer elements,

Figure 7 is a section on line 7—7 of Figure 2,

Figure 8 is a detail perspective view of the spring mounting and associated elements, and, Figure 9 is a detail perspective view of the spacing bar.

Figure 1:
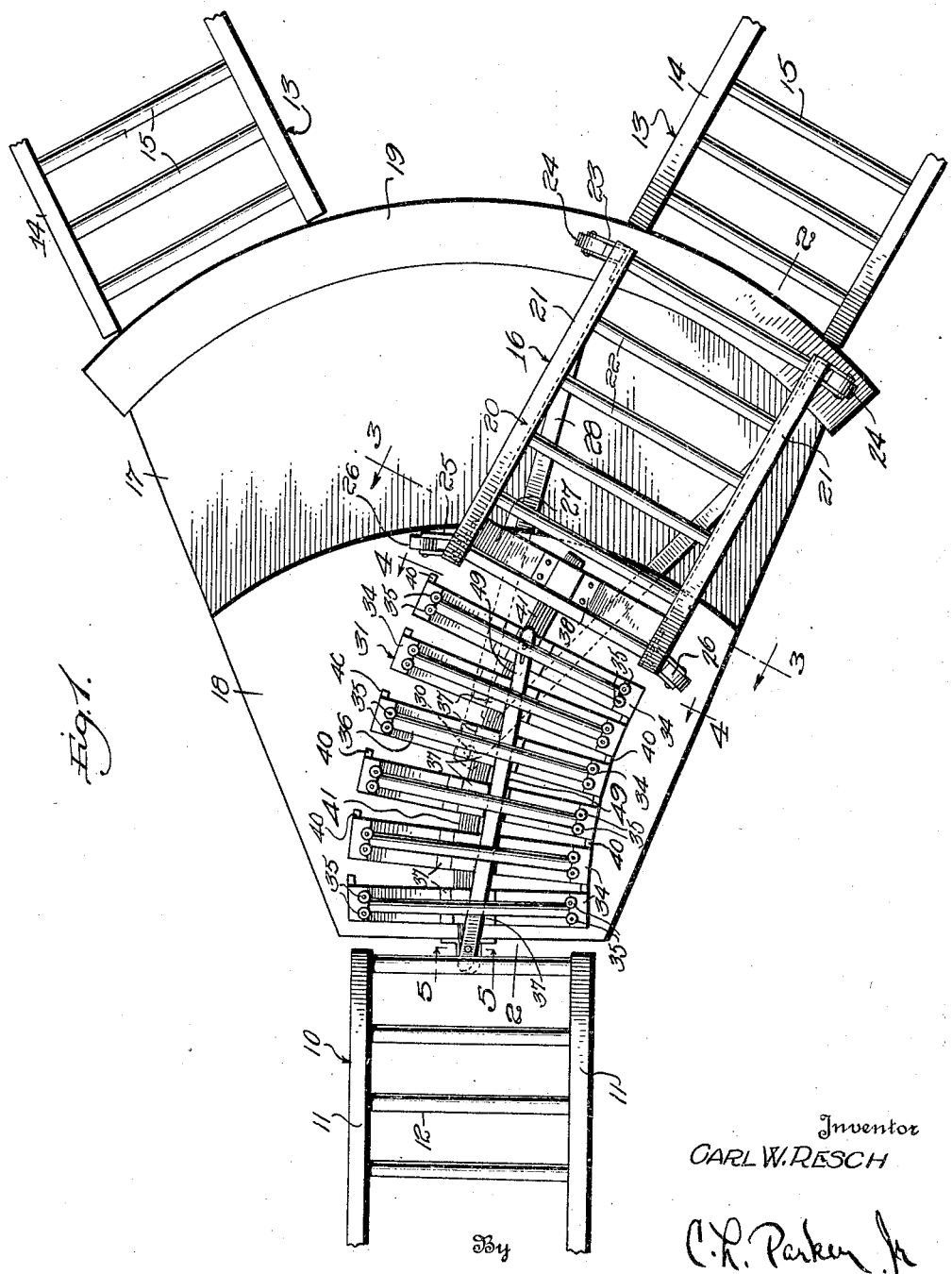
Figure 1 is a plan view.

Referring to Figure 1, the numeral 10 designates a main conveyer section including side rails 11 and transverse conveyer rollers 12 rotatably supported therebetween. Articles are adapted to be transferred between the main or fixed conveyer section and either of a pair of branch sections 13. Each of the branch sections is similar in construction to the fixed conveyer section, and includes side rails 14 between which are rotatably supported conveyer rollers 15. The device forming the subject matter of the present invention comprises a movable conveyer section indicated as a whole by the numeral 16. This conveyer section has one end arranged always in alinement with the conveyer section 10 and its opposite end adapted to be selectively arranged in alinement with the branch conveyers 13.

Referring to Figures 1 and 2, the numeral 17 designates a floor plate which is substantially fan shaped and spaced above the narrower end of this plate is arranged a second similarly shaped plate 18. A relatively narrow arcuate plate 19 is arranged above the wider end of the plate 17. An auxiliary branch conveyer section 20, comprising a part of the movable conveyer section 16, is adapted to move across the plates 18 and 19. The straight conveyer section 20 comprises parallel side rails 21 between which a plurality of conveyer rollers 22 is rotatably supported. The outer ends of the rails 20 are provided with bearing arms 23 carrying rollers 24 adapted to travel upon the plate 19. Similarly, the inner ends of the rails 21 are provided with bearing arms 25 carrying rollers 26 which travel upon the outer end portion of the plate 18. A transverse plate 27 is connected between the inner ends of the rails 21, for a purpose to be described.

Means are provided for causing the straight section 20 to swing in a given arcuate path. Referring to Figures 1 and 2, the numeral 28 designates a pair of arms which diverge toward the outer ends of the rails 21 and are arranged therebeneath. The spaced ends of the arms 28 are secured to the rails 21 by suitable brackets 29. As shown in Figure 2, the brackets 29 serve to space the arms 28 a sufficient distance below the rails 21 to permit the arms to extend beneath the plate 18, and the inner ends of the arms 28 are pivotally connected to the plate 18 by a bolt 30.

It will be apparent that the straight section 20 is rigidly connected to the arms 28, and the pivotal connection of the latter causes the section 20 to swing in an arc about the axis of the bolt 30. Obviously, the plate 19 is arranged concentric to the axis of the bolt 30, and this also is preferably true of the curved outer edge of the plate 18.

The movable section 16 also comprises a plurality of individual sections 31 which are adapted to assume substantially radial positions with respect to given centers, according to the branch conveyer 13 in alinement with which the straight section 20 is arranged. Each of the individual sections 31 is substantially identical, and only one need be referred to in detail. Referring to Figures 4 and 6, it will be noted that each individual conveyer section 31 comprises a substantially U-shaped supporting member including a bottom plate 32, and upstanding side plates or arms 33, the upper ends of which are turned inwardly substantially horizontally as at 34. Each inturned end 34 is preferably provided with antifriction rollers 35 projecting inwardly therebeyond and adapted to contact with articles passing around the curve defined by the sections 31 to facilitate the movement of the articles.

Each section 31 is further provided with a conveyer roller 36 extending longitudinally with respect thereto, and transversely with respect to the line of movement of articles, each roller 36 being journalled in the arms 33 of the corresponding section 31. A substantially inverted U-shaped clip 37 is carried by each base plate 32, each of the clips having outturned lower edge portions 38 riveted or otherwise secured to the plate 32 as at 39. One edge of each plate 32 is provided adjacent opposite ends thereof with laterally projecting lugs 40 for a purpose to be described. As will become apparent, one of the end sections 31 need not be provided with the projections 40, but all of the sections are preferably so made for the purpose of standardization in manufacture.

Referring to Figures 1, 2 and 4, the numeral 41 designates a spring made up of a plurality of laminations, and the spring extends slidably through each of the clips 37. Means is provided for securing the end of the spring adjacent the fixed section 10 in alinement therewith whereby the spring as a whole normally tends to assume the same position. Referring to Figures 2, 5 and 8, the numeral 42 designates an angle iron secured against the bottom of the plate 18 adjacent the inner end thereof. A pair of upstanding spaced angle irons 43 are secured at their lower ends to the angle iron 42, and the inner end of the spring 41 is arranged between the parallel portions of the angle iron brackets 43.

A substantially inverted U-shaped clip 44 has its arms arranged in contact with the outer faces of the spaced parallel arms of the angle irons 43, and a bolt 45 passes through the spring 41, the arms of the brackets 43, and the arms of the clip 44. Obviously the construction described is such as to rigidly hold the inner end of the spring 41 in alinement with the conveyer section 10. The opposite end of the spring passes through a substantially U-shaped clip 46 having outturned ends 47 secured to the plate 27 by rivets 48 or other fastening elements. It will be apparent that the spring is also slidably mounted in the clip 46.

As previously stated, the spring is slidably mounted in the clips 37 and 46, and means is provided for preventing spreading of the individual sections 31 away from each other, and for causing these members to assume the proper radial positions. For this purpose, a spacer rod 49 is arranged beneath the rollers 36 and is pivotally connected at one end to the horizontal portion of the clip 44 by a bolt or the like 50 (see Figures 2, 5 and 8). The opposite end of the rod 49 is longitudinally slotted as at 51 to slidably receive a pin 52 carried by the clip 37 of the section 31 adjacent the straight section 20. The slot is so arranged that the pin will be positioned in the outer extremity thereof when the fixed section 20 is arranged in alinement with one of the branch sections 13. Under such conditions, one of the projections 40 (see Figure 6) will contact with the adjacent plate 32 to fix the positions of the inner ends of these plates with respect to each other.

The operation of the apparatus is as follows:

When it is desired to transfer articles from the main conveyer 10 to one of the branch sections, or vice versa, the operator manually moves the straight section 20 to a position in alinement with the desired branch section. Such movement causes the straight section 20 to travel in an arc concentric with the axis of the bolt 30, as previously described, the rollers 24 and 26 traveling upon their respective supporting plates. At the same time, it will be apparent that such movement causes the spring 41 to be flexed to one side of its normal position, as for example, in the manner shown in Figure 1. Suitable latch means, not shown, may be provided for holding the parts in the position described.

When the parts have assumed the position referred to, the pin 52 will have reached the outer extremity of the slot 51 of the spacer rod 49, and accordingly it will be apparent that the distance between the adjacent individual sections 31 and the fixed conveyer 10 will be definitely fixed. The angularity of the remaining individual sections 31 will depend upon the spring 41, each section obviously assuming a position at right angles to a tangent to the spring 41 at the point at which the latter passes through the associated clip 37. Owing to the clearance between the parts, however, it is possible that the sections 31 may not assume the proper angular positions, but any such possibility is overcome by the provision of the projections 40. Each projection 40 at the inside of the curved defined by the ends of the sections 31, will contact with the adjacent plate 32, and accordingly the distance between the corresponding ends of these plates will be definitely fixed. Accordingly the sections 31 are caused to assume substantially radial positions with respect to a center established by the intersection of lines drawn at right angles to the conveyer sections 10 and 20, at the inner extremities thereof.

With the sections 31 arranged in the position described, it will be obvious that the associated rollers 36 will assume similar positions, and consequently the movement of articles around the curve defined by the section of the conveyer comprising the sections 31 will be greatly facilitated, and this movement is further facilitated by the provision of the anti-friction rollers 35. It will be apparent that the spring 41 constitutes a flexible element which controls the angular positions of the sections 31 whereby these sections, under all conditions, are radially arranged with respect to given centers, and since they are equidistantly spaced, adjacent pairs of the sections are arranged at equal angles with respect to each other.

The conveyer sections 10, 13 and 20 are sections of standard conveyers, and may be relatively cheaply manufactured. The sections 31 also are duplicates of each other whereby they may be economically produced. It will be apparent therefore that the apparatus as a whole is relatively cheap and easy to install, and has been found to be particularly efficient in operation.

It is to be understood that the form of the invention herewith shown and described is to be taken as a preferred example of the same and that various changes in the shape, size and arrangement of parts may be resorted to without departing from the spirit of the invention or the scope of the subjoined claims.

I claim:

1. A conveyer comprising a main section, a movable section having one end arranged adjacent and in alinement with one end of said main section, said movable section including a plurality of supports and a roller carried by each support, said rollers being normally parallel, a clip carried by each of said supports, a spring extending longitudinally of said movable section and slidably engaging each of said clips, means for securing one end of said spring adjacent said main section, and a reach rod for determining the length of said movable section in either of a plurality of positions thereof.

2. A conveyer comprising a main section, a movable section having one end arranged adjacent and in alinement with one end of said main section, said movable section including a plurality of supports and a roller carried by each support, said rollers being normally parallel, a clip carried by each of said supports, a spring extending longitudinally of said movable section and slidably engaging each of said clips, means for securing one end of said spring adjacent said main section, a pin carried by the support remote from said main section, and a reach rod pivoted at one end adjacent said main section and provided in its opposite end with a longitudinal slot slidably receiving said pin, said pin being arranged in the outer extremity of said slot when said movable section is arranged in either of two adjusted positions.

3. A conveyer comprising a main section, a movable section including a straight section and a plurality of rollers arranged between said main and straight sections, a pair of arms rigidly connected at one end to said straight section therebeneath, a fixed pivot pin passing through the opposite ends of said arms between said straight and main sections and in alinement with the latter, means including a spring longitudinally slidable with respect to and normally tending to hold said rollers parallel to each other and operative to cause said rollers to assume radial positions with respect to a given center to define a curved path forming a continuation of said main and straight sections when the latter is swung to a position out of alinement with said main section, and means for limiting the distance from said main section of the roller most remote therefrom.

4. A conveyer comprising a main section, a straight section, a plurality of supports arranged between the adjacent ends of said main and straight sections, rollers carried by said supports, a plate slidably supporting said supports, a spring rigidly mounted at one end adjacent one of said sections and slidably mounted at its other end substantially in alinement with the other section, a pair of arms rigidly connected at one end to said straight section and pivotally connected at their opposite ends beneath said plate at a point lying between said main and straight sections, and means for connecting said spring to said supports whereby the latter and their associated rollers occupy positions at right angles to said spring at their points of connection.

5. A conveyer comprising a main section, a straight section, a plurality of supports arranged between the adjacent ends of said main and straight sections, rollers carried by said supports, a plate slidably supporting said supports, a spring rigidly mounted at one end adjacent one of said sections and slidably mounted at its other end substantially in alinement with the other section, a pair of arms rigidly connected at one end to said straight section and pivotally connected at their opposite ends beneath said plate at a point lying between said main and straight sections, and clips carried by said supports and engaging said spring to maintain said rollers at right angles to said spring at any flexed position thereof.

6. A conveyer comprising a main section, a straight section, a plurality of supports arranged between the adjacent ends of said main and straight sections, rollers carried by said supports, a plate slidably supporting said supports, a spring rigidly mounted at one end adjacent one of said sections and slidably mounted at its other end substantially in alinement with the other section, a pair of arms rigidly connected at one end to said straight section and pivotally connected at their opposite ends beneath said plate at a point lying between said main and straight sections, clips slidably connecting said supports to said spring and operative to maintain each roller at right angles to said spring, and means for determining the maximum distance between the end of said main section and the roller furthest removed therefrom.

7. A conveyer constructed in accordance with claim 6 wherein each end of one support of each adjacent pair is provided with a portion engageable with the other support of such pair to limit the movement of the end portions of said supports toward each other.

8. A conveyer constructed in accordance with claim 6 wherein said means comprises a reach rod pivotally connected at one end adjacent said main section and engageable at its opposite end with the support of said last named roller, and means for limiting the movement of the end portions of said supports toward each other.

9. A conveyer comprising a main section, a movable section having one end arranged adjacent and in alinement with one end of said main section, said movable section including a plurality of supports and a roller carried by each support, a laminated spring extending longitudinally of said movable section and having one end anchored adjacent said main section, each of said supports being carried by and slidable longitudinally with respect to said spring and fixed against turning movement with respect thereto whereby movement of the other end of said spring transversely with respect to said main section is adapted to alter the positions of said rollers whereby they define a curved path, said supports being provided with members for limiting the turning movement of the end portions of said supports toward each other.

10. A conveyer comprising a main section, a movable section having one end arranged adjacent and in alinement with one end of said main section, said movable section including a plurality of supports and a roller carried by each support, said rollers being normally parallel, a spring extending longitudinally of said movable section and slidably engaging each support, means for securing one end of said spring adjacent said main section, and means for limiting the distance from said main section of the support most remote therefrom.

In testimony whereof I affix my signature.

CARL W. RESCH.